United States Patent [19]

Dunn et al.

[11] Patent Number: 4,650,508

[45] Date of Patent: Mar. 17, 1987

[54] METHOD AND APPARATUS FOR CHANGING BUSHINGS

[75] Inventors: Charles S. Dunn, Pataskala; Stephen Seng, Frazeysburg; Michael D. Hickman, Salem, all of Ohio

[73] Assignee: Owens-Corning Fiberglas Corporation, Toledo, Ohio

[21] Appl. No.: 798,047

[22] Filed: Nov. 14, 1985

[51] Int. Cl.$^4$ ............................................. C03B 37/09
[52] U.S. Cl. ............................................. 65/1; 65/2; 65/27; 65/172; 65/173
[58] Field of Search .................. 65/1, 2, 27, 172, 173

[56] References Cited

U.S. PATENT DOCUMENTS

| | | | |
|---|---|---|---|
| 1,249,868 | 12/1917 | Westbury | 65/173 |
| 1,333,903 | 3/1920 | Day | 65/173 |
| 2,075,756 | 3/1937 | Barker | 65/172 X |
| 3,837,823 | 9/1974 | Shealy | 65/1 |
| 3,934,998 | 1/1976 | Rowe | 65/172 |
| 3,997,309 | 12/1976 | Harris | 65/172 X |
| 4,525,188 | 6/1985 | Jensen | 65/1 |

Primary Examiner—Robert Lindsay
Attorney, Agent, or Firm—Ronald C. Hudgens; Greg Dziegielewski; Ronald E. Champion

[57] ABSTRACT

An apparatus for changing bushings in a glass melting furnace is disclosed. A support attached to the furnace holds the bushings beneath an opening in the forehearth. A replacement bushing is placed in the framework, translated next to the operating bushing, brought to operating thermal condition and then both bushings are translated until the replacement bushing is beneath the opening in forehearth. This eliminates the need to freeze the molten glass within the bushing.

10 Claims, 8 Drawing Figures

METHOD AND APPARATUS FOR CHANGING BUSHINGS

BACKGROUND OF THE INVENTION

In the manufacture of glass fibers, glass batch ingredients are melted in furnaces. The molten glass resulting from the melting of the glass batch mixtures is then fed into elongated forehearths or channels of various sizes and shapes. The forehearth forms an enclosure for the molten glass. The molten glass flowing in the forehearth is removed at many locations positioned along the length of the forehearth for subsequent processing. There are two major different forms of processing glass fibers.

The first major type of processing is for discontinuous glass fibers such as those used to manufacture insulation products and is described as a wool process. In the wool process, a ceramic or refractory block with a conical shaped cylindrical opening called a flow block is placed in an opening in the floor of a forehearth. This flow block allows the molten glass from the forehearth to flow in a uniform manner downward into a bushing block. The bushing block is a ceramic material which supports and surrounds a bushing having a cylindrically shaped opening. The bushing can be heated or cooled to provide a means to control the flow of the molten glass through the bushing. The bushing and bushing block have a flat upper face which is held against the lower face of the flow block. The molten glass passes through the bushing as a stream whose volume is controlled by the heating or cooling of the bushing. The molten glass stream flows into a spinner where it is centrifuged into discontinuous glass fibers.

The second major process for producing glass fibers produces continuous glass fibers such as are used for reinforcements for fiberglass reinforced products. This process is called a textile process. Again, a ceramic or refractory flow block is located in the opening of a forehearth. The flow block also has an aperture or cut-out section sloping downwardly. This aperture may be circular, rectangular or be composed of a series of openings. The flow block permits the molten glass to flow uniformly from the forehearth to a fiber forming bushing beneath the flow block. The glass fiber producing bushing is a generally rectangular shaped container of precious metal, open at the top having a plurality of holes or orifices at the bottom to allow the molten glass to pass through the orifices to produce glass fibers. The fiber glass bushing itself is mounted, typically, in a steel or iron framework. The frame has within its confines a castable ceramic surrounding the bushing metal to electrically isolate the bushing from the frame material, since during operation the bushing is electrically heated to maintain a given, uniform temperature.

Regardless of which type of process is used to produce glass fibers, it is necessary periodically to replace the bushings used in the process. It is almost impossible because of the number of bushings attached to a given forehearth to drain the forehearth of molten glass to effectuate this bushing change. The current method of changing a bushing involves removing power from the bushing and spraying the bushing with water to cool the bushing. This solidifies the glass in the bushing and the bushing block. Cooling is continued until the glass in the flow block solidifies. The steel or iron framework holding the bushing and bushing block is then removed. The bushing is separated from the solidified glass by chiseling the bushing away from the glass. The solidified glass in the flow block region is then smoothed with chisels or air hammers to present a smooth flat surface. The new bushing, bushing block and framework or support is then mounted in position and attached. Cooling water flow is discontinued, electrical power is reapplied to the bushing and the solidified glass in the flow block is allowed to melt.

The cooling of the bushing and bushing block by directing water on them causes considerable thermal shock to the refractory of the forehearth. The cooling of this region of the forehearth to the extent that glass solidifies in the flow block has an adverse effect on the remainder of the molten glass flowing in the forehearth. The physical removal of the bushing and bushing block and the smoothing of the solidified glass in the flow block by mechanical means causes considerable physical shock to the forehearth refractory and its supports. Potentially, portions of the forehearth refractory can be broken away seriously affecting the mechanical strength and integrity of the forehearth.

As can be seen from the above discussion, a need exists to be able to change bushings in a glass fiber producing environment without the associated thermal and physical shock associated with the current method.

DISCLOSURE OF THE INVENTION

The present invention utilizes a framework attached to the forehearth of a glass melting furnace, which supports and guides the bushing beneath the forehearth. A means is provided to translate the bushing along this framework to position the bushing beneath the opening in the bottom of the forehearth. The forehearth is an enclosure for the molten glass and the opening is in the form of a flow block. The translating means is retractable such that a replacement bushing may be placed in the framework. The replacement bushing is pushed up against the operating bushing by the translating means. A portable heating and/or cooling device is connected to the replacement bushing and the bushing is brought to a stable operating temperature. The permanent heating and/or cooling device is disconnected from the operating bushing. The translating means then pushes the replacement bushing laterally, displacing the operating bushing and placing the replacement bushing beneath the opening in the floor of the forehearth. The portable heating and/or cooling device is removed from the replacement bushing and the permanent heating and/or cooling device is attached. The translating device is retracted and the original operating bushing is removed from the framework. The framework also includes a device to apply pressure against the bushing to force the bushing into intimate contact with the bottom of the forehearth. By use of this device the bushing may be changed with minimal physical and thermal shock to the forehearth, and without the necessity of solidifying the glass within the bushing.

BEST MODE FOR CARRYING OUT THE INVENTION

Figure 1:
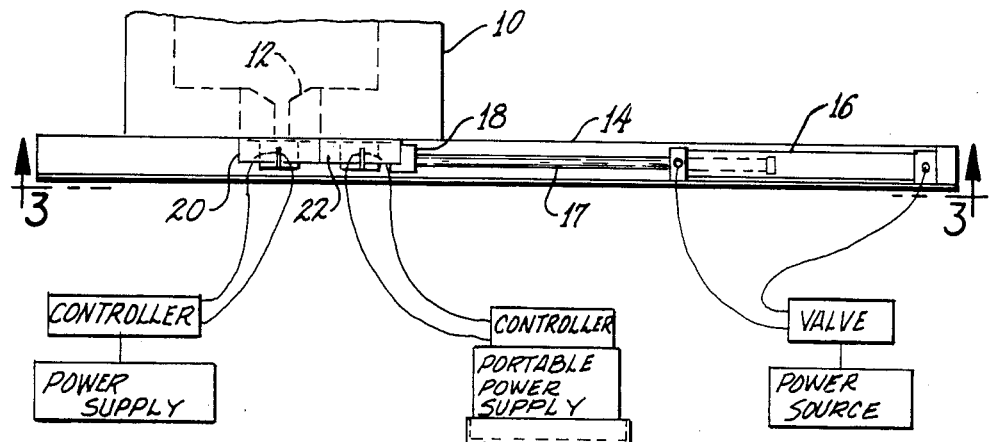
FIG. 1 is a side view of an apparatus for changing textile type bushings.

FIG. 1 shows a side view of an apparatus for changing a bushing in a glass melting furnace. A partial view of a forehearth 10 of a glass melting has a flow block 12 positioned in the floor of the forehearth. The flow block has an opening through the flow block which allows molten glass to flow into an operating bushing 20. The bushing represented in FIG. 1 is a textile or direct fiber forming bushing. A replacement bushing 22 is shown positioned next to the operating bushing. The operating bushing is heated and/or cooled as is known in the art by a permanently mounted controller and power supply. The replacement bushing is brought to operating thermal condition by a portable power supply and controller whose connections are flexible and capable of being translated with the replacement bushing. The bushings are capable of being translated along a guide rail 14 which is part of a support assembly by a hydraulic cylinder 16 which is controlled by a valve and power source. The hydraulic cylinder has a moveable rod 17 which may be extended or retracted by action of the power source and valve. The moveable rod is attached to a rod end 18 which is guided by the guide rails and contacts the bushings to translate the bushings along the guide rails as will be explained below.

Figure 2:
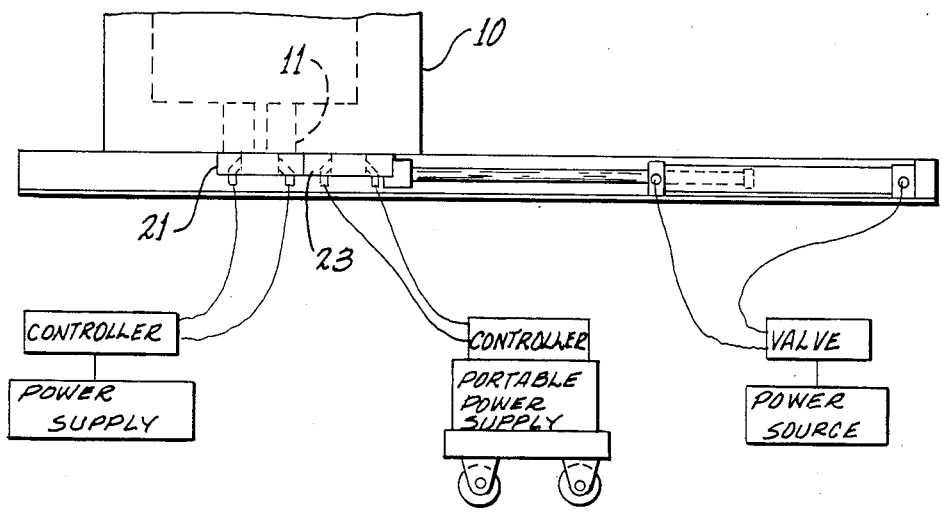
FIG. 2 is a side view of an apparatus for changing wool type bushings.

FIG. 2 is the same as FIG. 1 except the flow block 11 represents the flow block of a wool type application. Similarly, operating bushing 21 and replacement bushing 23 represent the type of flow control bushing used in wool or indirect fiber forming applications. The actual fiber formulation is performed in a secondary device known as a spinner (not shown). In a wool application the primary purpose of the bushing is to accurately control the flow of the molten glass to a secondary fiber forming apparatus.

Figure 4:
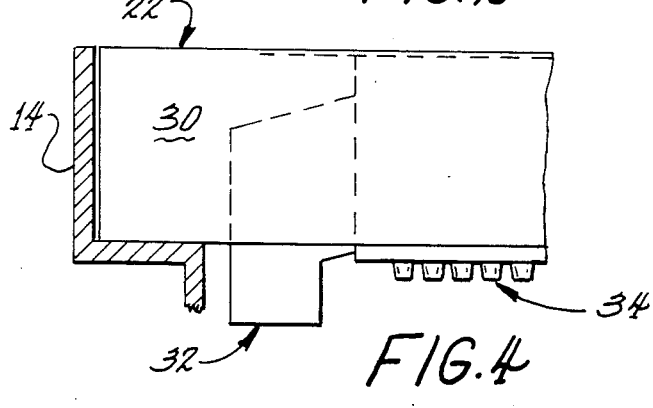
FIG. 4 is a partial sectional view of the Support Framework and a textile bushing.
Figure 3:
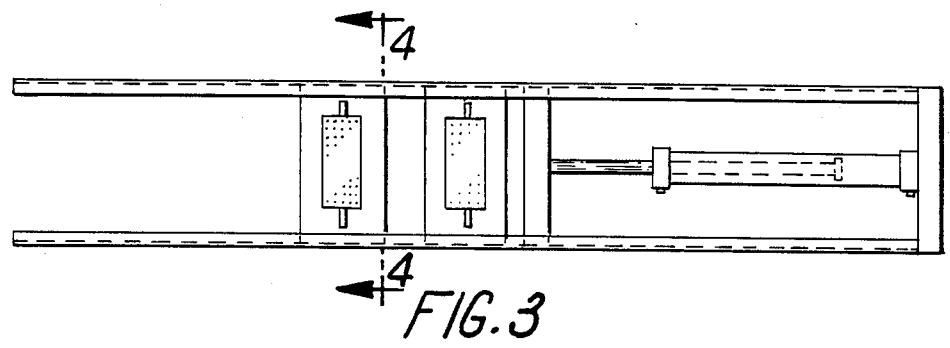
FIG. 3 is a bottom view of an apparatus for changing bushings with a replacement bushing in the load position.
Figure 3A:
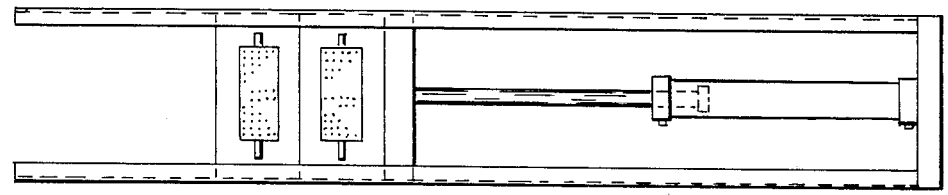
FIG. 3A shows the replacement bushing of FIG. 3 translated next to the operating bushing.
Figure 3B:
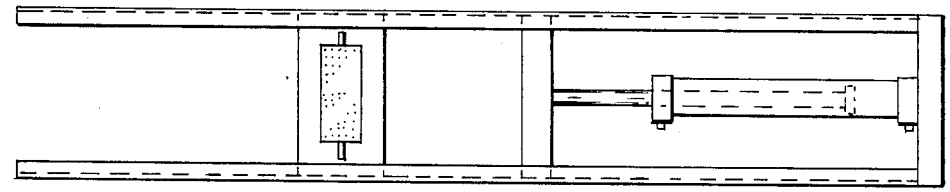
FIG. 3B shows the replacement bushing in the operating position, the original operating bushing removed and the translating device retracted.
Figure 5:
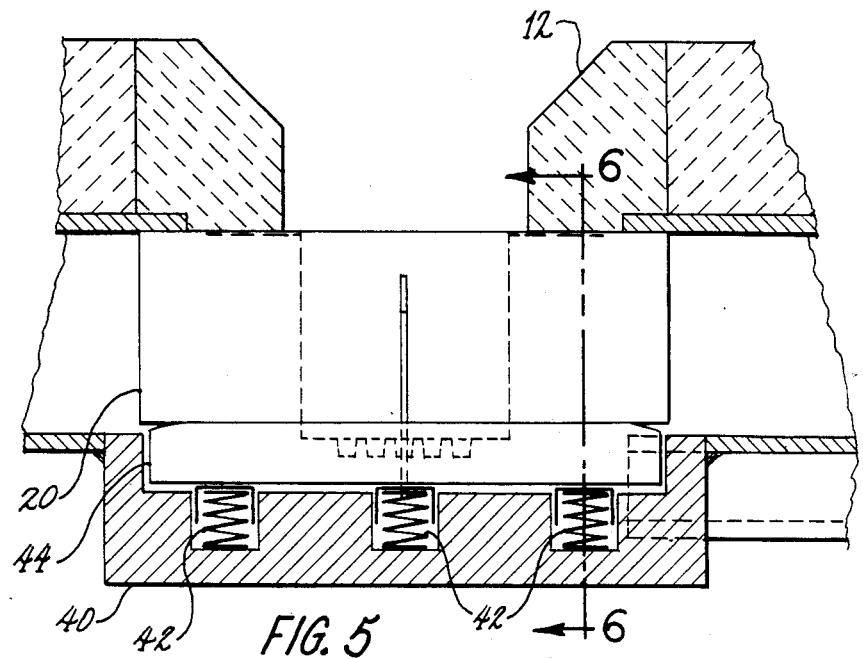
FIG. 5 is a sectional side view of the compression device.
Figure 6:
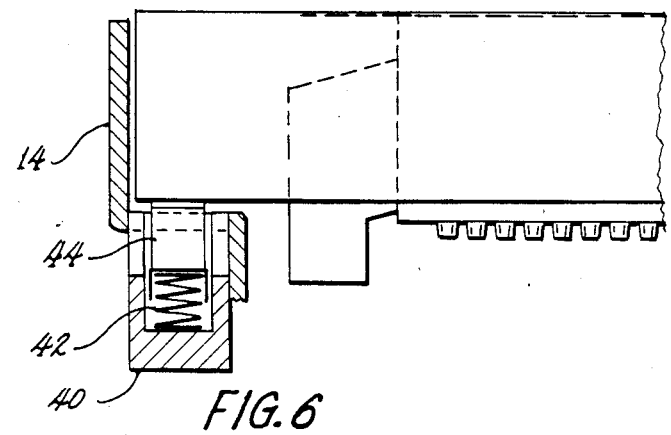
FIG. 6 is a sectional longitudinal view of the compression device.

FIG. 3 is a bottom view of the bushings and guide rails along the line of section 3—3 of FIG. 1. The left most bushing is the operating bushing in position beneath the opening in the flow block. The actuator rod of the hydraulic cylinder has been retracted and the right most bushing is the replacement bushing. In FIG. 3 the replacement bushing has just been placed inside the guide rails. FIG. 3A shows the hydraulic cylinder translating the replacement bushing next to the operating bushing. In FIG. 3B the replacement bushing has been positioned beneath the opening in the flow block, the previous operating bushing has been removed and the hydraulic cylinder has been retracted. FIG. 4 is a partial sectional view along section line 4—4 of FIG. 3. The bushing block assembly 22 is composed of a fiber forming bushing 32, having fiber producing orifices 34 formed in the bottom thereof and surrounded by an electrically insulating refractory material 30. The entire bushing block assembly is fabricated such that it fits within and is moveable in a linear manner along guide rails 14. Additional metal framing (not shown) may be added about the periphery of the refractory to strengthen the assembly and provide a suitable wear surface. FIG. 5 shows a longitudinal sectional view of the support assembly and the bushing block beneath the flow block 12 of the forehearth. A compression assembly composed of a compression member 44 and springs 42 is supported by support 40 which is attached to the guide rails. FIG. 6 is a sectional view along section lines 6—6 in FIG. 5 and shows a sectional side view of the compression assembly.

The guide rails are attached to the refractory of the forehearth and are also attached to the cylinder which produces the translation. In order to change a bushing the following steps are performed. The cylinder or translating device is retracted. The operating bushing is attached to the permanent power supply and controller and fibers are being produced. When a change becomes necessary, a replacement bushing is lowered into the guide rails. The cylinder translates the replacement bushing next to the operating bushing without disturbing the position of the operating bushing. The portable power supply and controller are attached to the replacement bushing and the bushing is brought to operating thermal equilibrium. The permanent power supply connections are removed from the operating bushing, the cylinder actuated and both bushings are translated along the guide rails until the replacement bushing is beneath the opening in the flow block. The cylinder is retracted, the portable power supply connections are removed from the replacement bushing and the permanent power supply is connected to the replacement bushing. The original operating bushing is further translated along the guide rails, allowed to cool and then removed for repair. The compression device always insures that the upper face of the bushing block assembly is forced upward against the bottom of the flow block to prevent molten glass from leaking from this interface. It should be noted that the hydraulic cylinder is shown as an example of a translating device but any device such as linear screws, cable and pullies or gear driven motor known in the art may be used as a translating device. Similarly, the compression device is shown as a compression device with springs but cams, levers, or air or hydraulic cylinders may also be used.

INDUSTRIAL APPLICABILITY

In forming glass fibers, bushings are used to control the flow of molten glass to the fiber forming apparatus or to process the glass fiber directly. These bushings wear or are damaged and periodically need to be replaced. The present invention provides an apparatus and a method to allow the bushings to be changed without inducing physical or thermal shock to the refractory of the forehearth and without thermally upsetting the molten glass remaining in the forehearth.

We claim:

1. An apparatus for changing bushings associated with a glass melting furnace comprising:
   an enclosure holding molten glass;
   an opening in the bottom of said enclosure;
   a first bushing for forming glass fibers located against said enclosure covering said opening;
   a second bushing for forming glass fibers located adjacent to said first bushing;
   a means to support said first bushing and said second bushing contact with said enclosure;

and a means for simultaneously translating said first bushing and said second bushing laterally along said support means until said second bushing covers said opening such that molten glass cannot flow between said first bushing and said second bushing during translation.

2. An apparatus for changing bushings as recited in claim 1 wherein said enclosure is a forehearth of a glass melting furnace.

3. An apparatus for changing bushings as recited in claim 2 wherein said opening is a ceramic or refractory flow block.

4. An apparatus for changing bushings as recited in claim 1 wherein said means for support comprises a framework having guide rails, said guide rails including a spring loaded member to apply pressure against said first bushing and said second bushing.

5. An apparatus for changing bushings as recited in claim 4 wherein said means for simultaneously translating said first bushing and said second bushing includes a hydraulic cylinder attached to said framework.

6. An apparatus for changing bushings comprising:
a forehearth containing molten glass having an opening in the bottom thereof;
an operating bushing forming glass fibers located below said opening;
a replacement bushing for forming glass fibers located adjacent said operating bushing;
a structure attached to said forehearth supporting said operating bushing and said replacement bushing; and
a means for simultaneously translating said operating bushing and said replacement bushing laterally until said replacement bushing is beneath said opening in said forehearth such that molten glass cannot flow between said operating bushing and said replacement bushing during said translation.

7. An apparatus as recited in claim 6 wherein said structure is comprised of a framework having guide rails, and spring loaded members associated with said guide rails applying pressure against said operating bushing to force said operating bushing against said opening.

8. An apparatus as recited in claim 7 wherein said means for simultaneously translating said operating bushing and said replacement bushing includes a hydraulic cylinder attached to said framework.

9. An apparatus for changing bushings in a forehearth of a glass melting furnace comprising:
a forehearth containing molten glass having an opening in the bottom thereof;
a flow block located in said opening through which molten glass exists said forehearth;
an operating bush for forming glass fibers located below said flow block;
a power supply connected to said operating bushing supplying electrical energy to said operating bushing;
a replacement bushing for forming glass fibers mounted adjacent to said operating bushing;
an auxiliary power supply connected to said replacement bushing supplying electrical energy to said replacement bushing;
a framework attached to said forehearth supporting and guiding said operating bushing and said replacement bushing;
a means attached to said framework for simultaneously translating said operating bushing and said replacement bushing until said replacement bushing is directly below aid flow block such that molten glass cannot flow between said operating bushing and said replacement bushing during said translation; and a means to disconnect said auxiliary power supply from said replacement bushing and for connecting said power supply to said replacement bushing.

10. A method for changing bushings in a forehearth of a glass melting furnace comprising the steps of:
flowing molten glass in a forehearth of a glass melting furnace;
providing an opening in the bottom of said forehearth for said molten glass to exit said forehearth;
positioning an operating bushing for forming glass fibers below said opening; positioning a replacement bushing for forming glass fibers adjacent to said operating bushing beneath said forehearth;
supporting said operating bushing and said replacement bushing by guide rails having spring loaded members which apply vertical pressure to force said operating bushing and said replacement bushing against the bottom of said forehearth; and simultaneously forcing said operating bushing and said replacement bushing laterally with and replacement bushing is beneath said opening such that molten glass cannot flow between said operating bushing and said replacement bushing.

* * * * *